(12) United States Patent
Dearth et al.

(10) Patent No.: US 6,854,032 B2
(45) Date of Patent: Feb. 8, 2005

(54) SYSTEM FOR ACCESSING A REGION OF MEMORY USING REMOTE ADDRESS TRANSLATION AND USING A MEMORY WINDOW TABLE AND A MEMORY REGION TABLE

(75) Inventors: Glenn A. Dearth, Groton, MA (US); Christopher J. Jackson, Westford, MA (US); Mark R. Johnson, Merrimack, NH (US)

(73) Assignee: Sun Microsystems, Inc., Santa Clara, CA (US)

( * ) Notice: Subject to any disclaimer, the term of this patent is extended or adjusted under 35 U.S.C. 154(b) by 364 days.

(21) Appl. No.: 10/007,154

(22) Filed: Dec. 4, 2001

(65) Prior Publication Data

US 2003/0105914 A1 Jun. 5, 2003

(51) Int. Cl.[7] .............................................. G06F 12/00
(52) U.S. Cl. ........................... 711/2; 711/164; 711/152; 711/202
(58) Field of Search .............................. 711/2, 163, 164, 711/152, 202, 206

(56) References Cited

U.S. PATENT DOCUMENTS

| | | | | |
|---|---|---|---|---|
| 6,578,122 B2 | * | 6/2003 | Beukema et al. | 711/163 |
| 6,601,148 B2 | * | 7/2003 | Beukema et al. | 711/153 |
| 6,658,521 B1 | * | 12/2003 | Biran et al. | 710/315 |
| 6,691,217 B2 | * | 2/2004 | Beukema et al. | 711/170 |
| 2002/0078271 A1 | * | 6/2002 | Berry | 710/36 |
| 2002/0124117 A1 | * | 9/2002 | Beukema et al. | 709/314 |
| 2002/0124148 A1 | * | 9/2002 | Beukema et al. | 711/163 |
| 2002/0178339 A1 | * | 11/2002 | Beukema et al. | 711/203 |
| 2002/0184392 A1 | * | 12/2002 | Parthasarathy et al. | 709/249 |
| 2003/0046505 A1 | * | 3/2003 | Craddock et al. | 711/165 |

OTHER PUBLICATIONS

InfiniBand™ Architecture Specification vol 1, Release 0.9, Mar. 31, 2000, Published by InfiniBand[SM] Trade Association.

InfiniBand™ Architecture Specification vol. 2A, Release 0.9, Apr. 7, 2000, Published by InfiniBand[SM] Trade Association.

* cited by examiner

Primary Examiner—Reginald G. Bragdon
Assistant Examiner—Christian P. Chace
(74) Attorney, Agent, or Firm—Meyertons Hood Kivlin Kowert & Goetzel, P.C.; B. Noël Kivlin; Rory D. Rankin

(57) ABSTRACT

A system for permitting remote user access to regions of memory that have been exported for remote direct memory access purposes. The system supports dynamically changing access privileges to remote users without requiring intervention from an operating system. The system may include a memory region table and a memory window table for supporting address translations. Entries in the memory window table may include a region remote access key and a window remote access key. The memory region table may include fields for a physical address, an access value, a protection domain value, and a length of memory region.

22 Claims, 9 Drawing Sheets

SYSTEM FOR ACCESSING A REGION OF MEMORY USING REMOTE ADDRESS TRANSLATION AND USING A MEMORY WINDOW TABLE AND A MEMORY REGION TABLE

TECHNICAL FIELD

The present invention relates to system area networks and, more particularly, to remote memory access between end nodes on a system area network.

BACKGROUND ART

In a system area network ("SAN"), multiple processors compete for services and access to memory locations in order to write data to, or read data from the memory locations. One type of network, well known in the prior art, is Ethernet. In an Ethernet network, connections are established between processors or nodes, but memory regions associated with the nodes and the data contained in them are isolated from direct access. In order for a local host processor to access a remote memory location, it is necessary to invoke the operating system ("OS") associated with the remote memory location. This is because the OS, and more particularly, the OS kernel, controls memory management. Invocation of the OS kernel to access remote memory is time consuming and may overburden the kernel. Consequently, other functions (e.g., process and task management and disk management functions) controlled by the kernel may be interrupted.

SUMMARY OF THE INVENTION

A system for permitting remote user access to regions of memory that have been exported for remote direct memory access purposes is provided. The system supports dynamically changing access privileges to remote users without interventions from an operating system. Such a system includes a memory region table for supporting memory region translations and a memory window table, the memory window table being in communication with the memory region table. Both the memory region table and the memory window table reside on a module external to and in communication with the operating system. The memory window table may include a field for recording a memory region record and a field for recording a memory window record. In a related embodiment of the invention, the memory region table virtually resides in the operating system of the computer.

The memory region table may include a field for recording a physical address corresponding to a first memory location of a memory region, a field for recording an access value corresponding to the memory region, a field for recording a protection domain value corresponding to the memory region and/or a field for recording a length of the memory region. Similarly, the memory window table may include a field for recording a region remote access key for accessing a memory region and/or a field for recording a window remote access key corresponding to the memory window. The memory window table may also include a field for recording a virtual address corresponding to a first memory location within a memory window, a field for recording a length of the memory window, a field for recording an access value corresponding to the memory window and/or a field for recording a protection domain value corresponding to the memory window.

A remote access key for accessing a memory region table or a memory window table is also provided wherein each of the memory region table and memory window table are resident on a computer readable medium. The remote access key includes a field for recording a bit that indicates whether the remote access key corresponds to a memory region or a memory window translation. In accordance with related embodiments, the remote access key may also include a field for recording a window table access key, a field for recording a protection domain value corresponding to a memory window table entry, a field for recording an index corresponding to a memory window table entry and/or a field for recording a region key corresponding to a memory region table entry.

Also provided is a method for binding a memory window to a memory region without invoking an operating system kernel. The method includes the process of reading pointers to a memory window table entry and a memory region table entry associated with a bind request, the memory window table and the memory region table each residing in a module external to and in communication with the operating system, and reading the memory region entry and memory window entry. Access privileges associated with the bind request are determined as is the question of whether the memory window associated with the memory window entry is contained in the memory region associated with the memory region entry. The memory window entry is then updated to include a memory region table index in order to bind the memory window to the memory region if the memory window is contained in the memory region and access is permitted. The method may also include the process of generating a memory window remote access key corresponding to the memory window.

Determining access privileges associated with the bind request may include comparing a protection domain value in the memory region entry with a protection domain value in the memory window entry and a protection domain value corresponding to a work queue invoking the bind request. Determining access privileges associated with the bind request may further include the process of comparing an access value in the memory window entry with an access value in the memory region entry.

Determining whether the memory window associated with the memory window entry is contained in the memory region associated with the memory region entry may include the process of comparing a length in the memory window entry with a length in the memory region entry and/or comparing a virtual address in the memory window entry with a virtual address in the memory region entry.

Another method for binding a memory window to a memory region without invoking an operating system kernel is also provided. The method includes the process of reading a pointer to a memory window table entry, a pointer to a first memory region table entry, and a pointer to a second memory region table entry associated with a bind request. The memory window table and the memory region table each reside on a module external to and in communication with the operating system. The first memory region entry, the second memory region entry, and the memory window entry are read, and access privileges associated with the bind request are determined. Whether the memory window associated with the memory window entry is contained in the memory region associated with the memory region entry is also determined, and the memory window entry is updated to include a memory region table index in order to bind the memory window to the memory region if the memory window is contained in the memory region and access is permitted. A memory window remote access key may then be generated.

Again, determining access privileges associated with the bind request may include comparing a domain value in the memory window entry with a domain value in the second memory region entry and a domain value corresponding to a work queue invoking the bind request. Further, determining whether the memory window associated with the memory window entry is contained in the memory region associated with the memory region entry may include reading a length in the memory window entry, comparing a virtual address in the second memory region entry with a virtual address in the first memory region entry and/or comparing a length in the second memory region entry with a length in the first memory region entry. The method may further include the process offsetting the length in the memory window entry to create a index start value and an index end value and resetting an index in the memory window entry to a value between the index start value and the index stop value.

A memory window table for accessing a memory region, wherein the memory window table resides on a computer readable medium in communication with an operating system kernel is also provided. The memory window table includes a field for recording a memory window record and a field for recording a memory region record. The memory window record may also include a protection domain value for the memory window, a virtual address corresponding to the first location of the memory window, a length corresponding to the length of the memory window, a region key for accessing a memory region, and/or a window key for accessing a memory window. The memory region record may include a protection domain value for the memory region, a virtual address corresponding to the first location of the memory region, and/or a length corresponding to the length of the memory region. In accordance with an embodiment of the invention, the length of the memory window record is equal to the length of the memory region record.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
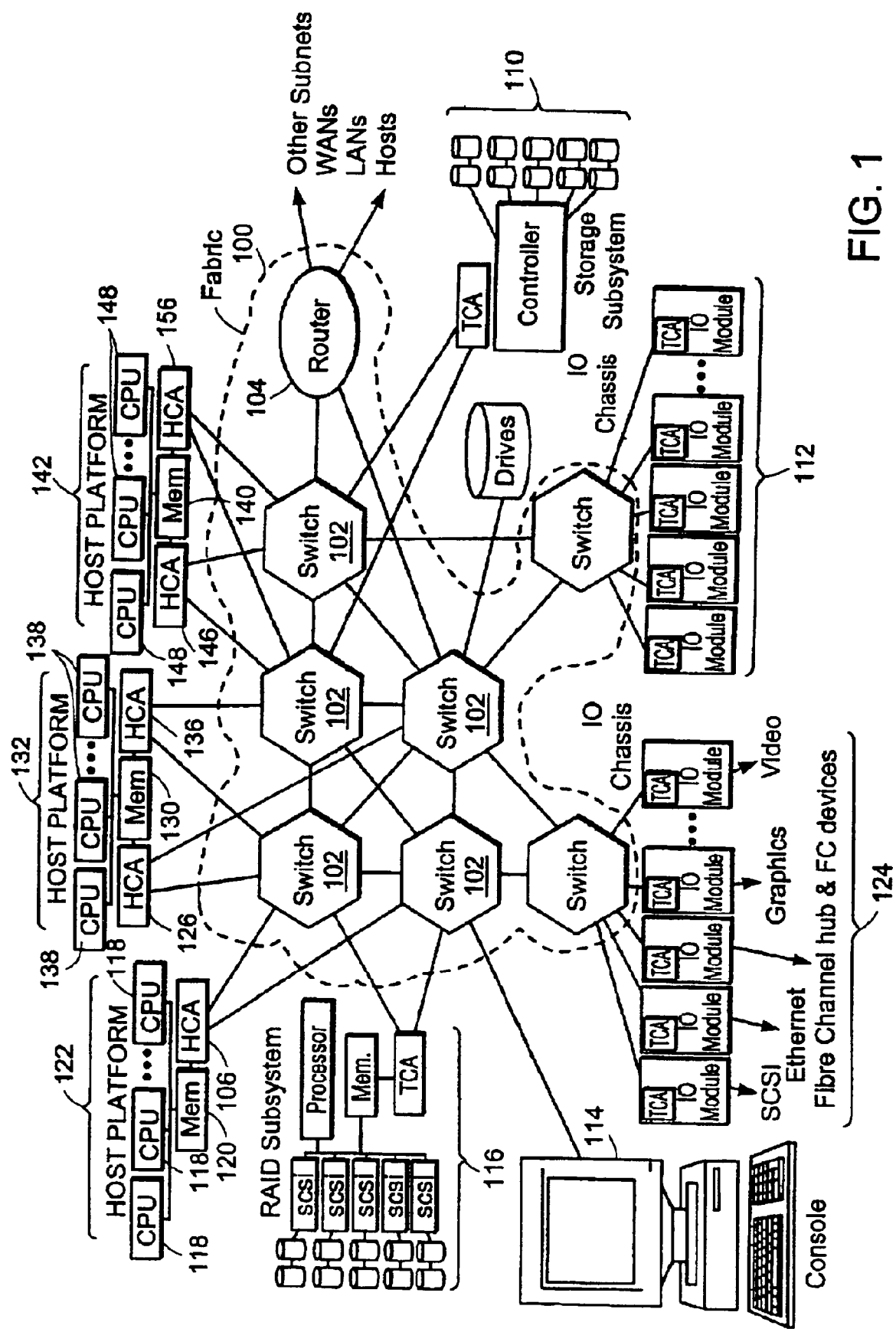
FIG. 1 is a block diagram illustrating a system area network which may be used in conjunction with an embodiment of the present invention.

Recent developments in SAN architecture attempt to minimize the need for kernel intervention during a remote memory access operation. FIG. 1 illustrates one such SAN architecture, the InfiniBand$^{SM}$ Architecture developed by the Infiniband$^{SM}$ Trade Association, the specification for which is hereby incorporated herein by reference (Infiniband is a trademark of the Infiniband Trade Association). The Infiniband architecture defines a first order interconnect technology for interconnecting processor nodes 122, 132, and 142 and IO nodes 112 and 124, as well as hardware transport protocols sufficient to support reliable messaging (send/receive) and memory manipulation semantics without software intervention in the data movement path.

By designing a point-to-point, switched IO fabric 100, end node devices (e.g., processor nodes 122, 132 and 142, IO nodes 112 and 124, RAID subsystem 116, storage subsystem 110, and console 114) are interconnected by switch devices 102. The fabric 100 also includes routers 104 for communication with sub-networks, wide area networks, local area networks and external processor nodes. The fabric 100 provides a reliable transport mechanism where messages are enqueued as work requests (in work queues comprising a send work queue and a receive work queue) for delivery between end nodes.

Host computers 118 at a processor node 122 interface with the fabric 100 through one or more host channel adaptors 106, 126, 136, 146, and 156. The channel adapters 106, 126, 136, 146, and 156 are hardware components in the processor nodes 122, 132 and IO units 112, 124 that generate and consume data packets. Certain channel adapters of the Infiniband$^{SM}$ architecture are programmable direct memory access engines with special protection features that allow direct memory access operations to be initiated locally or remotely. Further, each of these channel adapters maintains a translation and protection table ("TPT") that supports memory region translations. The channel adapters use the translation and protection table to translate virtual addresses to physical addresses validate access rights.

The channel adaptor at processor node 122 shares memory 120 with the host computers 118. Likewise, at processor node 132, the channel adapters 126 and 136 share memory 130 with host computer 138. Memory registration mechanisms defined by the InfiniBand$^{SM}$ architecture and implemented by a host operating system allow a user on the host to describe a set of virtually contiguous local memory locations or a set of physically contiguous local memory locations in order to allow the channel adapters to access them. A user must register these memory locations, through the operating system kernel of the host computer, before use. A set of contiguous memory locations that have been registered are referred to as a memory region. When a memory region is registered, the kernel provides, inter alia, a memory region handle, which identifies a memory region for memory management; a region remote access key (a "region R_key"), which is used with a virtual address to provide authorization for a remote device to access the local memory region; a region local access key (a "region L_key") which is used to calculate the index the to memory region table; and a virtual address that corresponds to the first memory location in the set of contiguous memory locations in the region. The memory registration process is described in greater detail with respect to FIG. 5 below.

In accordance with an embodiment of the present invention, a user may enable memory windows to be bound to a memory region when registering a memory region. As used herein, a "memory window" is a resource that provides remote access to a particular area of the memory region, much like a window in a building allows one to view a particular area within the building. In one embodiment, each memory window has an associated window handle, a set of access privileges, and an associated window remote access key (a "window R_key"). This window R_key of the window corresponds to the region R_key of the region it is currently bound to and may change as the memory window is bound to different memory regions.

A memory window can only be bound to a memory region that belongs to the same protection domain. A protection domain is a set of processes, resources, and addresses for associating memory regions and work queues. As noted above, a work queue pair consists of a send work queue and a receive work queue that a user employs to submit a work request (generally, a read or write operation) to the channel adapters for processing. Each memory region must be associated with a single protection domain. However, multiple memory regions may be associated with the same protection domain. Remote access requests are allowed only when the memory region and the work queue invoking the request are in the same protection domain.

Figure 2:
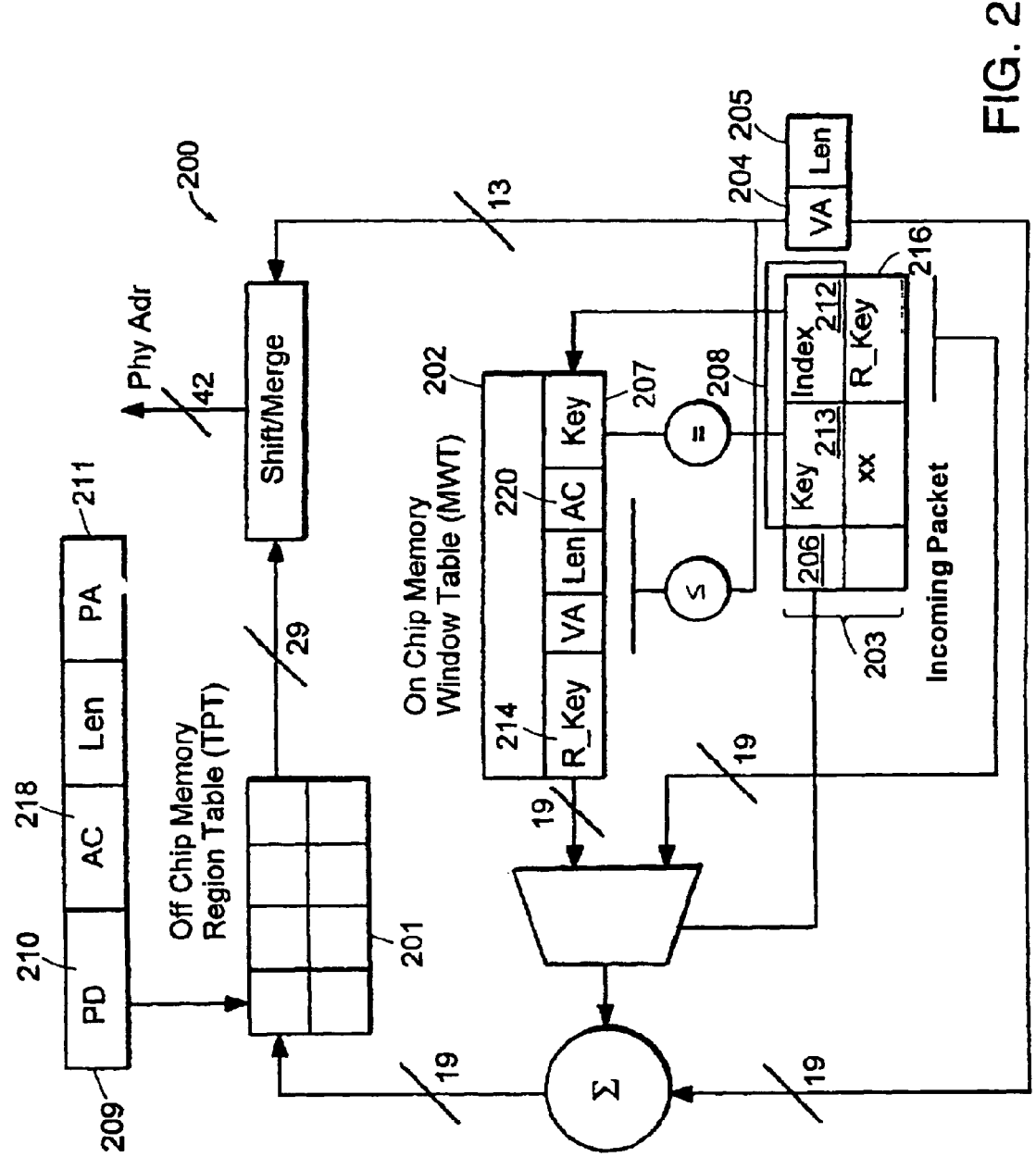
FIG. 2 is a block diagram illustrating remote memory translation system in accordance with an embodiment of the invention.

FIG. 2 is a block diagram illustrating remote memory access translation system. In this embodiment, the system 200 includes a memory region table 201 (or, in the case of the Infiniband[SM] architecture, a translation and protection table). The TPT 201 supports memory region translations and resides on a module external to and in communication with the operating system of a host computer, such as on a channel adapter. The system 200 also includes a memory window table 202 which supports memory window translations. The memory window table also resides outside the operating system of the host computer on a separate module from the memory region table. When a remote direct memory access request is submitted to the system, the request packet contains a remote access key 203 and a virtual address 204. In accordance with an embodiment of the invention, the remote access key is either a region R-key 216 or a window R_key 208. The packet may also contain a length 205 and operation type (not shown).

In order to access remote memory directly, the channel adapters 106, 126, 136, 146 and 156 must first determine whether the remote access key 203 corresponds to a memory region translation or a memory window translation. This is accomplished by checking the most significant bit 206 of the remote access key 203. ( The most significant bit 206 determines whether the remote access key is a region R_key or a window R_key. In this manner, entries in the memory window table are conserved.) If the bit 206 indicates a memory region translation (making the remote access key a region R_key), then the hardware will combine the virtual address 204 and the remote access key 203 to create an index into the memory region table 201. The memory region table entry 209 is accessed, and the protection domain value 210 in the memory region table entry 209 is compared with the protection domain value associated with the work queue initiating this translation. If the values are the same, access is permitted, the requested operation is performed, and, if necessary, the physical address 211 is combined with an offset value to derive the physical memory location of the memory region.

If the most significant bit 206 of the remote access key 203 indicates a memory window translation (making the remote access key a window R_key), then a lookup into the memory window table 202 occurs. The window R_key 208 for a memory window translation can be viewed as a two field quantity. The first field 212 represents an index into the memory window table 202 and the second field 213 is a window table access key that is compared with a window table access key 207 stored in the memory window table 202. If the window table access keys 213 and 207 match, the translation is allowed to continue.

Figure 3:
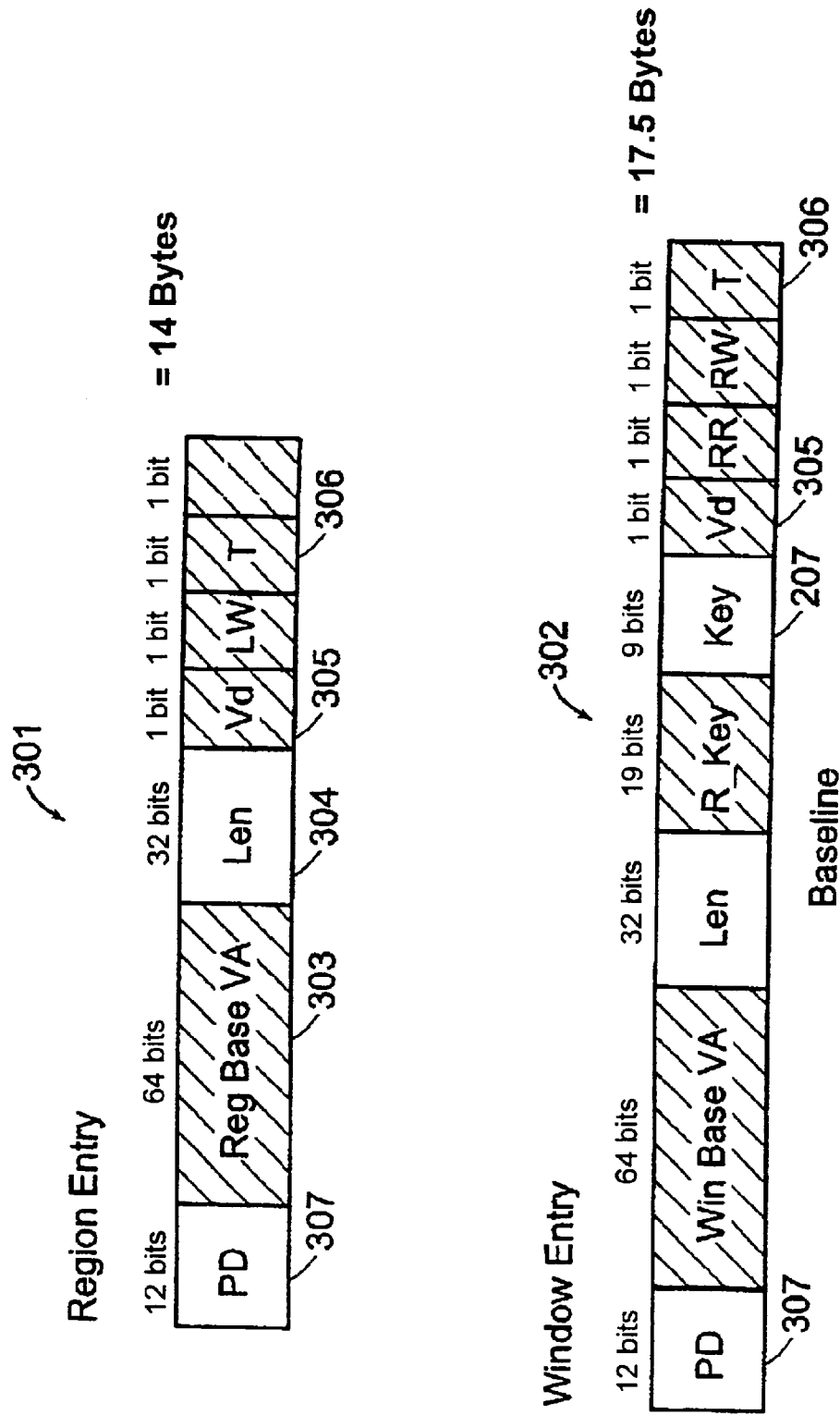
FIG. 3 is a block diagram illustrating the format of a memory window table entry in accordance with another embodiment of the present invention.

FIG. 3 is a block diagram illustrating the format of a memory window table entry. An entry in the memory window table 202 includes a memory region record 301 and a memory window record 302. Including the region record 301 in the memory window table 202 simplifies hardware sequential processing that would be needed when the window is bound to a memory region. By employing this window table entry format, the hardware device does not need to interrogate the memory region table to determine if the binding is valid. The hardware device need only consult a single entry in the window table.

If the window table access keys 213 and 207 are equal, and the packet's virtual address 204 and length 205 are properly contained within the memory window entry, a lookup to the memory window table will produce a new remote access key 214 (shown in FIG. 2). The new remote access key 214 will be added to the virtual address 204 from the packet to produce an index into the memory region table 201. The translation then proceeds as described above for memory region translations.

Figure 4:
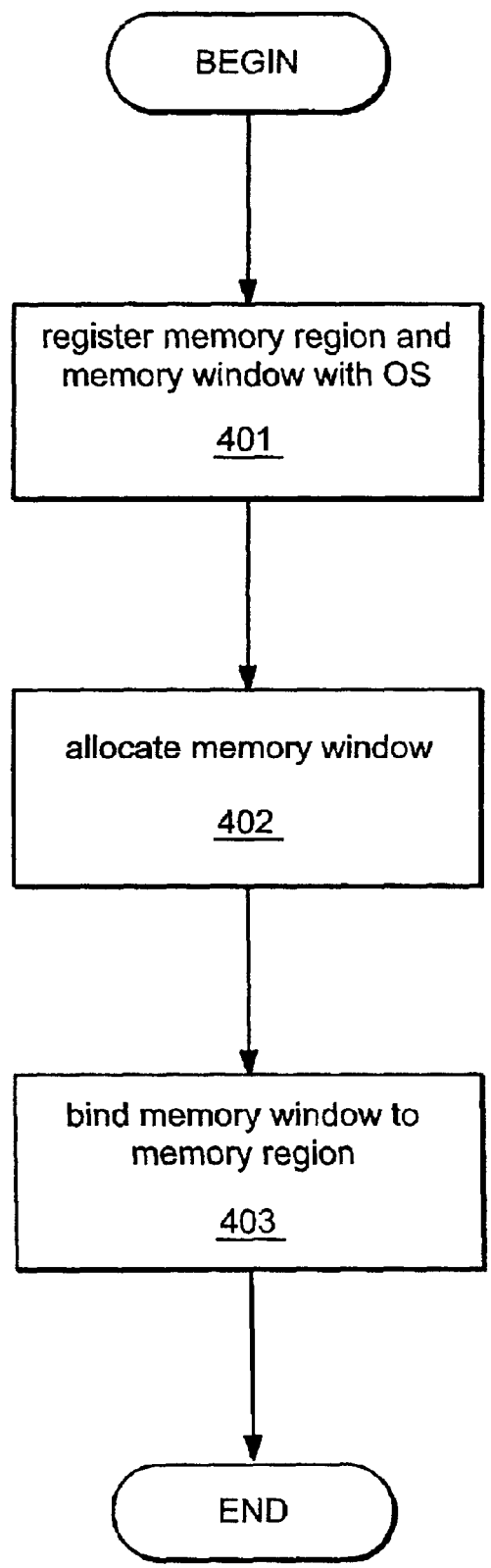
FIG. 4 is a flow chart illustrating a method for linking a memory window to a memory region in accordance with a further embodiment of the present invention.

FIG. 4 is a flow chart illustrating a method for linking a memory window to a memory region. In process 401, a user registers a memory region with the host operating system. The operating system kernel will perform the registration operation by calling a library routine whose purpose is to locate free contiguous entries in the memory region table 201. The library routine also assigns a physical mapping to each entry of the memory region table, records each physical mapping in the memory region table, records a protection domain value in the memory region table, and returns a region R_key and a memory region handle to the user. (Note that an R_key will not be returned if the memory window is being linked to a region for local use. Rather, a region L_key will be returned.) A memory window is allocated in process 402. Allocating the memory window also invokes the operating system kernel which locates a free entry in the memory window table 202, writes the protection domain associated with the memory region to which the memory window may be bound into this entry, sets the length value to zero, and returns an unbound window R_key and a memory window handle.

The memory window is bound to the memory region in process 403. The binding process 403 is a separate operation from the registration and allocation processes and does not invoke the kernel. The bind process is initiated by a user some time after registration and allocation through a bind request submitted to a work queue. Checks must be done to ensure that the user is authorized to perform the bind operation because the bind process 403 is executed in user mode. Without these checks, a user could potentially hijack another process' memory window and effectively stream unauthorized data into its virtual address space. In accordance with one embodiment, the security checks for the bind process 403 are done by checking the protection domain value of the bind requester (the work queue initiating the bind process) with the protection domain value associated with the memory window and the protection domain value associated with the memory region. All three protection domain values must match for the bind to be accepted. Further, the address range associated with the memory window specified by the bind request must be contained in the region, i.e., the window cannot be wider than the region.

As noted above, the memory window table 202 has two different entry types. It has a memory window record 302, and a memory region record 301. Constructing the memory window table with memory region and memory window records 301 and 302 provides flexibility in assigning windows. When an operating system kernel creates a memory region, a parameter is specified indicating whether the memory region may be bound. If the memory region can be bound, then a driver will write a memory region record that defines a base virtual address 303 and length 304 into the memory window table 202. The driver also writes the physical addresses corresponding to the memory region into the memory region table.

Figure 5:
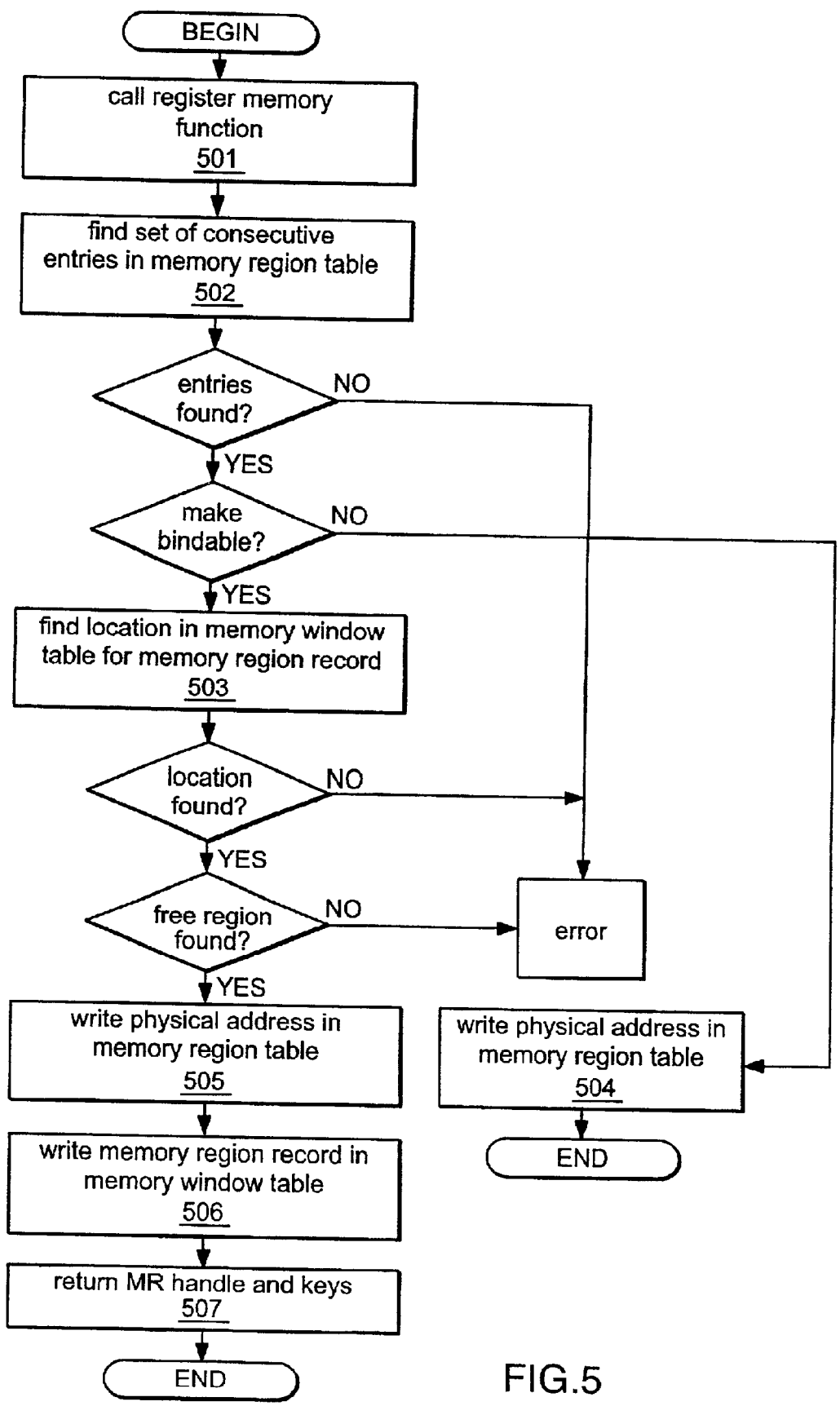
FIG. 5 is a flow chart illustrating a method for registering a memory region in accordance the embodiment of FIG. 4.

FIG. 5 is a flow chart illustrating the registration process in greater detail in accordance with a further embodiment of the invention. In process 501, a user requests to register a region of memory to which remote access will be permitted by calling a register memory function with the hardware device, or channel adapter associated with the host, or user's computer. The register memory region function passes parameters necessary to access a remote memory location including a virtual address corresponding to a first memory location available for remote access, a length, a protection domain value, an access value, such as 218 in FIG. 2, and the handle of the hardware device requesting registration. The register memory region function will cause the operating system to find 502 a set of consecutive entries in the memory region table that will satisfy the mapping size requested by the user. If the operating system cannot find a set of consecutive entries in the memory region table, an error will occur. If the operating system is able to find a set of consecutive entries, and the user chooses to designate the entries bindable, the operating system must also find a location in the memory window table in which to write a memory region record in process 503. (If the region found is not designated as a bindable region, the physical addresses associated with the region will simply be written 504 to the memory region table and process 503 will be omitted.) If a location for the memory region record is found in the memory region table, and a free bindable region is found, the physical addresses corresponding to the region are written to the memory region table, as in process 505, and a memory region record is written 506 to the memory window table 202. If a location for the record is not found in the memory window table or a free bindable region is not found, an error will occur. The entries corresponding to the memory region are identified in the memory window table as an index, and, as noted above, the memory region record 301 defines the base virtual address and length of the memory region. The register memory region function returns 507 a memory region handle, a region R_key and a region L_key upon its completion. The region L_key is used to calculate the index to the memory region table which identifies the entry corresponding to the memory region. If the memory region cannot be registered either because there are not enough contiguous entries in the memory region table or there is not a location in the memory window table for a memory region record, the registration process will fail.

Figure 6:
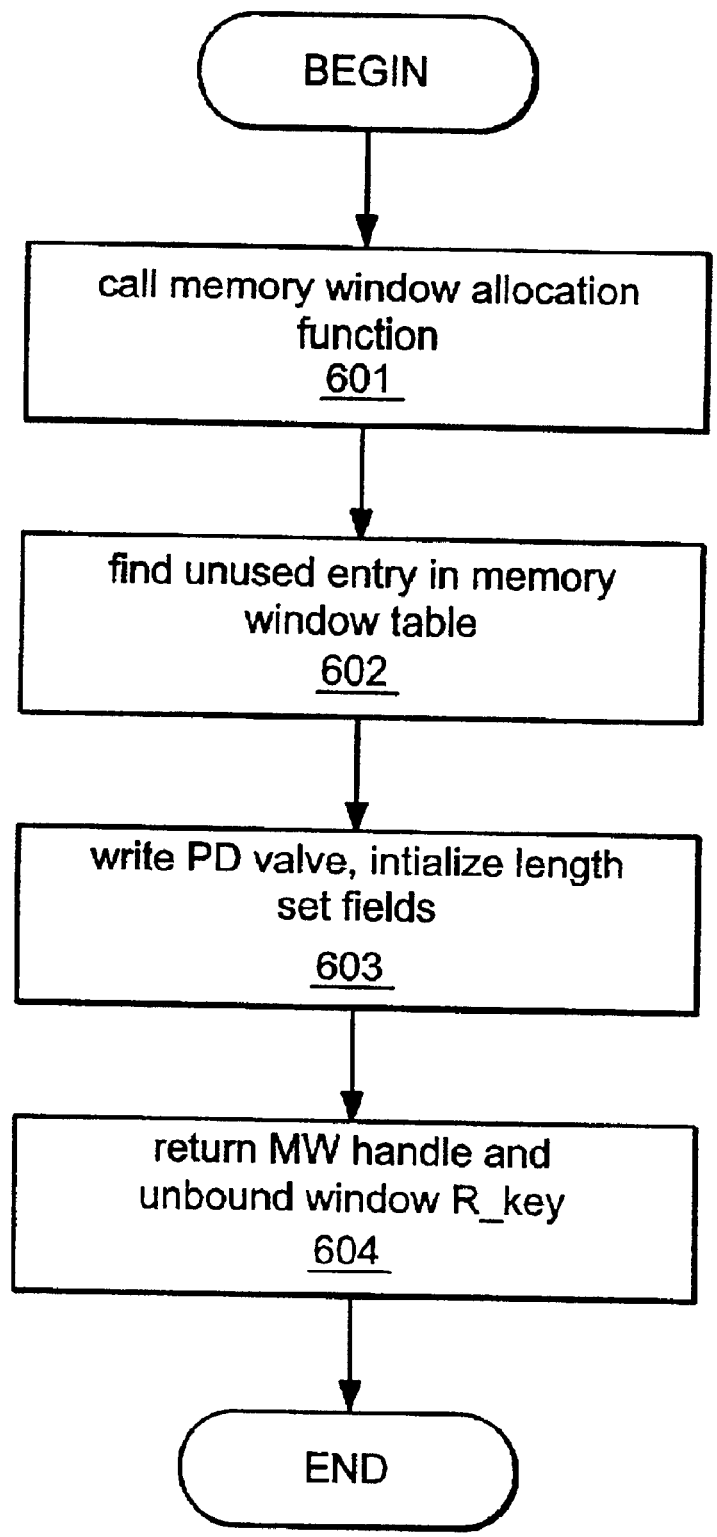
FIG. 6 is a flow chart illustrating a method for allocating a memory window in accordance with the embodiment of FIG. 4.

As noted previously, before a memory window can be bound to a memory region it must first be allocated. The allocation process is shown in FIG. 6. In process 601, a memory window allocation function is called and the operating system kernel code will be invoked. The allocate memory region function passes parameters that include a protection domain value and the handle of the hardware device requesting registration. The operating system kernel will look 602 for an unused entry in the memory window table 202 in which to place the memory window record 302. Once a free entry is located, the operating system software will write 603 a protection domain value 307 into the entry, initialize the length 304 at zero, and set the valid and type fields 305 and 306. The allocate memory window function returns 604 a memory window handle and an unbound window R_key upon its completion.

Figure 7:
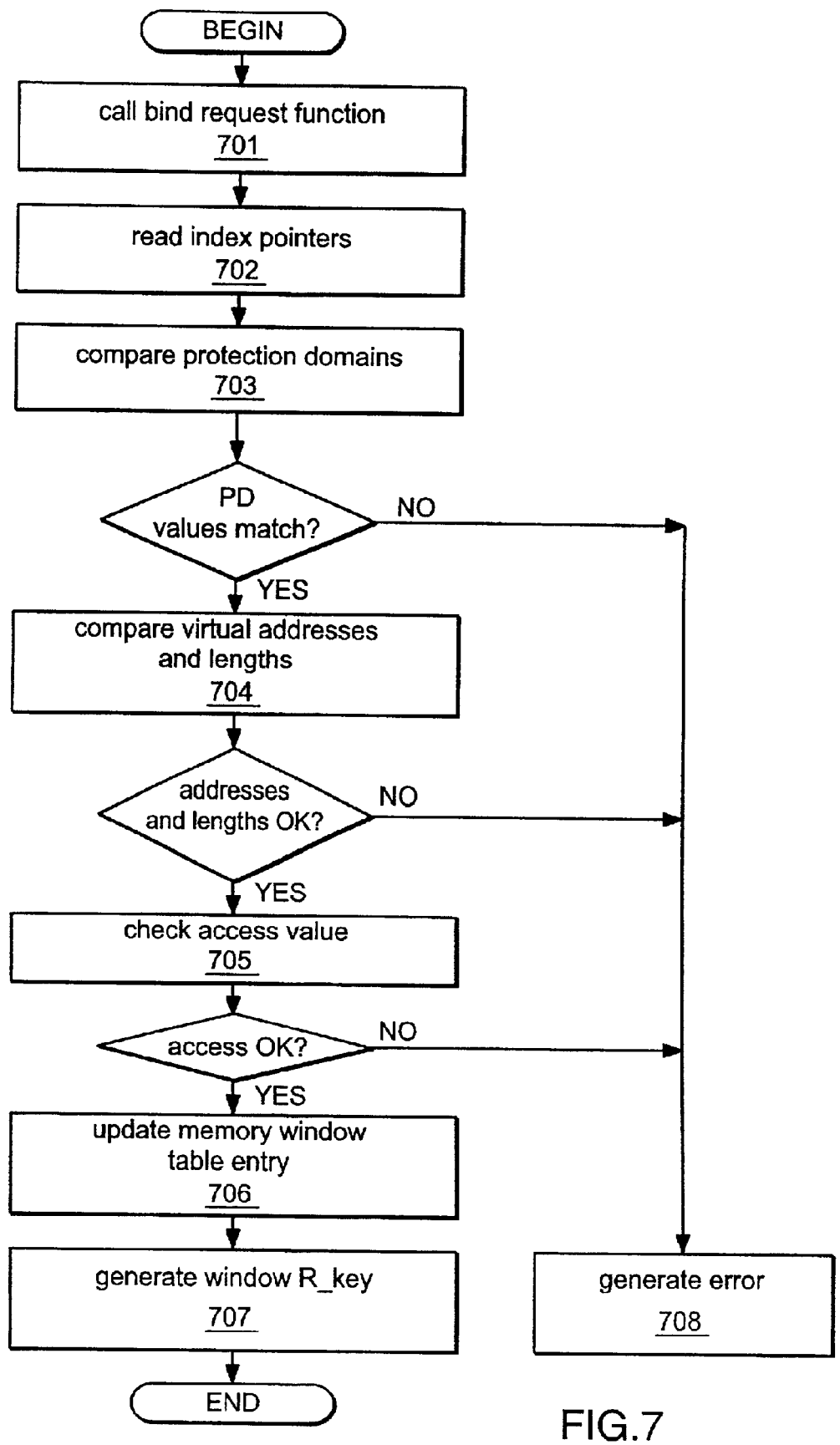
FIG. 7 is a flow chart illustrating a method for binding a memory window to a memory region in accordance with the embodiment of FIG. 4.

FIG. 7 is a flow chart illustrating a method for binding a memory window to a memory region in accordance with an embodiment of the invention. After a memory region has been registered and a memory window has been allocated, the user is free to bind the memory window to a memory region. This bind process can be done without invoking privileged code from the operating system, therefore the hardware needs to perform the access security checks. Bind operations may be performed by calling a bind request function, such as that provided by the verbs of the Infiniband$^{SM}$ architecture, in process 701. The bind request function creates a work request and then inserts it onto a send queue of a queue pair associated with the bind request. The bind request function passes parameters that include a pointer to a memory window table index and a pointer to a new memory region table index which are read in process 702. The bind request function also passes parameters such as a virtual address, length, a region L_key, a window R_key, a memory region handle, a memory window handle, a queue pair handle, and the handle of the hardware device making the bind request.

A series of comparisons are now performed to check the validity of the request. The protection domain values associated with the new memory region entry, memory window entry and queue pair involved in the transaction are compared in process 703. If the protection domain values do not match, an error will be generated in process 708. If the protection domain values are the same, the virtual address and length in the memory window entry and the virtual address and length associated with the new memory region entry are compared in process 704. The virtual addresses of covered by the window must be contained in region. If the virtual address and length of the new memory region entry is greater than the virtual address and length in the memory window entry, an error will be generated. If, however, the virtual address of the new memory region table entry is less than or equal to the virtual address in the memory window table entry then the access value 220 of the memory region table is checked to ensure proper access rights in process 705. If the access value indicates proper access rights, the memory window table entry is updated 706 with the virtual address, length, new memory region table index, the region L_key and access value of the memory region with which the memory window is bound and a new window R_key is generated 707.

It should also be noted that the operating system software allows arbitrary ratios of window to region entries. For example if an implementation assume a window table of 1024 entries, one entry could be assigned as a region entry which would then support up to 1023 entries of windows bindable to the region.

As described above, upon completion of a bind request, a new window R_key is generated for the memory window entry record 302. The window R_key is calculated by calling a function that passes a base virtual address and memory region table index as parameters, (i.e., region R_key=f(Base_VA, MRT_index). The function shifts (as indicated by <<or >>) the address bits of the base virtual address and truncates the result to x bits, where x is defined by the size of the memory region table. For example, according to this implementation, x is 19 which supports 512K entries, and the function is given by:

S_Base_VA[63:0]=Base_Va[63:0]>>log 2(entry_size)
region R_key[x:0]=S_Base_VA[x:0]−MRT_index [x:0] and the inverse of the function is:
MRT_index[x:0]=S_VA[x:0]−region R_key[x:0].

(Note that this is a specific illustration an that this calculation can be implemented in several different ways where x is some other number of bits. For example, this calculation could be implements as an add function using twos compliment addition and x could be 32 bits.)

As indicated above the window key is composed of two parts, a window table access key 213 and a memory window table index 212. The memory window table index 212 is determined at window allocation time by privileged code that manages the memory window table. The window table access key 213 is a value unique to the host channel adapter and is created at bind time. In accordance with the example above, the format for the window key is:

window R_key[31:0]=0x80000000+domainkey[19:11]+ index[10:0].

Figure 8:
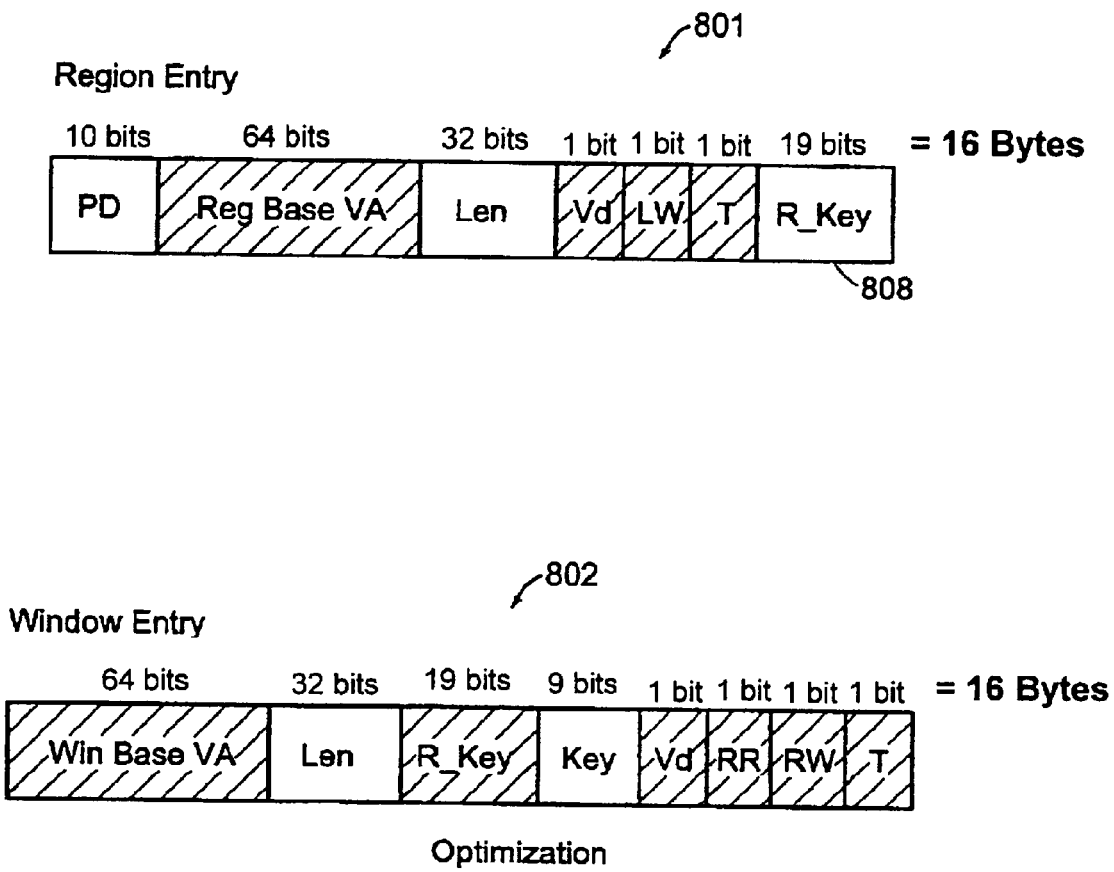
FIG. 8 is a block diagram illustrating an optimized memory window table entry in accordance with a further embodiment of the invention.

It is possible to reduce remote access memory width further, if necessary, by making the memory region record 301 and memory window record 302 the same size. FIG. 8 is a block diagram illustrating an optimized window memory table entry. In this case, the protection domain value 307 has been removed from the memory window record 802. Generally, removing the protection domain value 307 is problematic because it increases the potential for hijacking and disruption of a memory window is an issue. To eliminate this problem, the corresponding memory region record 801 has been modified to include a region R_key 808 to the base region entry in the memory region table 201. The region R_key 808 is used in the check process to determine if the bind request is valid as described with respect to FIG. 9.

Figure 9:
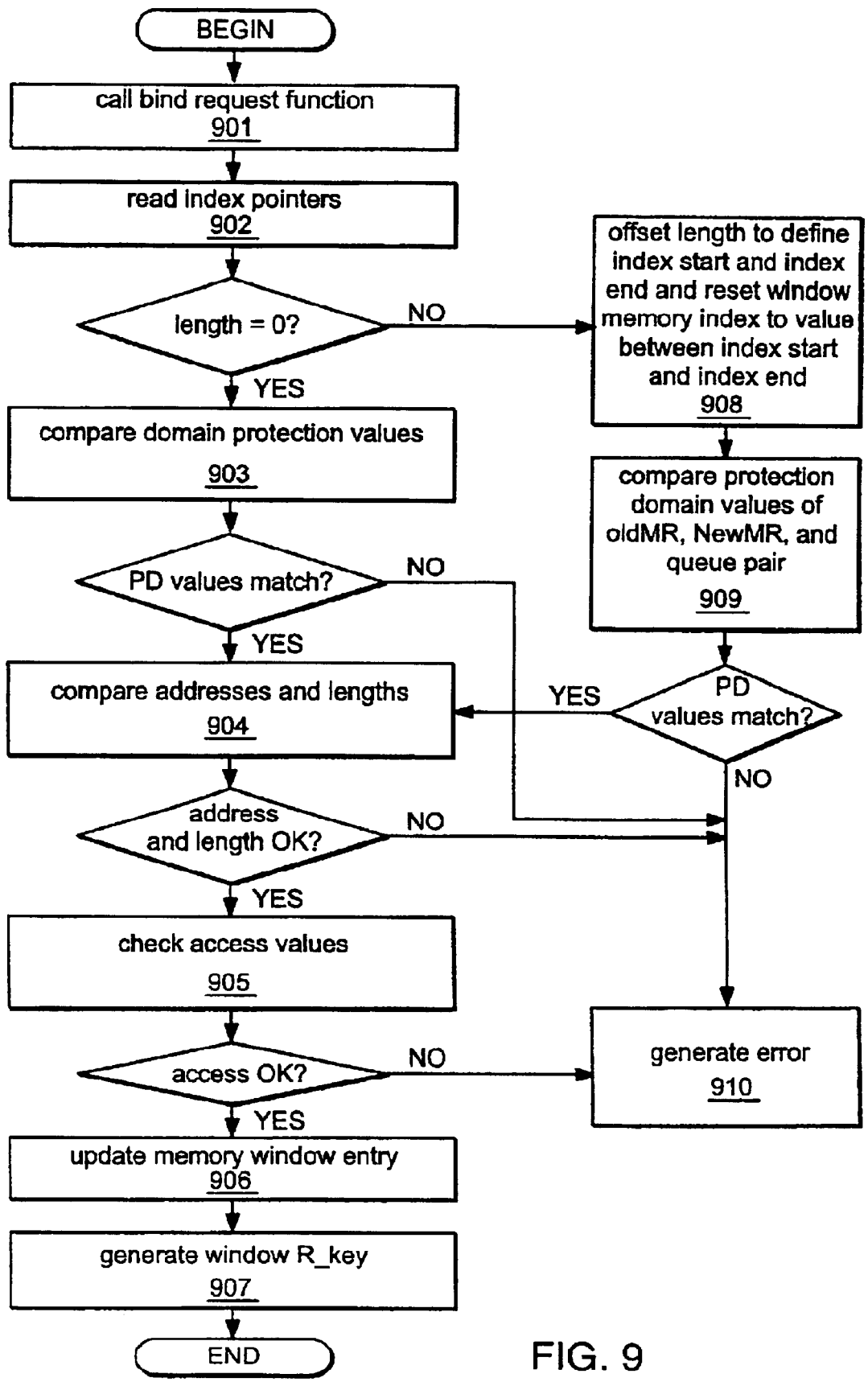
FIG. 9 is a flow chart illustrating a method for binding a memory window to a memory region in accordance with the embodiment of FIG. 8.

FIG. 9 is a flow chart illustrating a method for binding a memory window to a memory region in accordance with the embodiment of FIG. 8. According to this embodiment, the bind request function passes parameters that include a pointer to a memory window table index (which does not contain a protection domain value), a pointer to an old memory region table index, a pointer to a new memory region table index, a virtual address, length, access value, protection domain value, a region L_key, a window R_key, a memory region handle, a memory window handle, a queue pair handle, and the handle of the hardware device making the bind request. (Note that for this embodiment, the old or previously bound memory region table index is passed by the bind request function. The hardware device instituting the bind function may need to perform three reads to the memory window table. Reading the previous memory region table entry (indicated by the old memory region table index) allows the hardware to check the protection domain value contained in the region R_key to ensure that the bind request is valid in the case that the length associated with the memory window index is not zero as described below.)

The hardware is notified as described above with respect to FIG. 7, and the bind request function is called 901. The entries pointers are read 902 and a length in the memory window entry is also read 903. If the memory window indicated by the memory window index is not bound to a region (either because the window was just allocated or there was a previous unbind), the operating system will have set the length associated with the memory window entry to zero and the protection domain will have been written to the window table access key field 207. The hardware can assume that the protection domain value is valid and contained in the window table access key field. The window table access key associated with the memory window entry is read, and the protection domain value contained within it, is compared 903 with the protection domain value of the new memory region entry and the protection domain value of the queue pair associated with the bind request. If the protection domain value is valid, then the virtual address associated with the new memory region entry and its length is compared 904 with the current virtual address and its length. (If the protection domain is not valid an error is generated 910.) If the new virtual address and new length are within the region defined by the current virtual address and length, then the access value of the memory region table is checked 905. If the access value of the memory region table indicates proper access rights, then the memory window entry fields are updated 906 as described above with respect to FIG. 7 and a window R_key is generated 907.

However, if the window is currently bound to a region, the length associated with the memory window entry will not be zero. In this case, the hardware knows that the protection domain value is not in the memory window access key field and it must check to see if the memory window is contained in the currently bound region. The length associated with the old memory region will be offset to define an index start value and an index end value and the index associated with the memory window entry is reset to a value between the index start value and index end value, in process 908, to insure that it is properly contained within the old memory region as supplied by the bind command. This also insures that the protection domain value the old memory region entry is valid. The protection domain value of the new memory region entry is compared 909 with the protection domain value of the old memory region entry and protection domain value of the queue pair and, if valid, the process proceeds as above with respect to processes 904 through 907 and a window R_key is generated. Thus, the protection domain value in the memory window table is not needed. (Note that this check must be done before the memory window table is updated with the new bind information.)

Although the embodiments hereinbefore described are preferred, many modifications and refinements which do not depart from the true spirit and scope of the invention may be conceived by those skilled in the art. For example, It is intended that all such modifications, including but not limited to those set forth above, be covered by the following claims.

What is claimed is:

1. A system for accessing a region of memory in a computer, the system comprising:
   a network interconnect;
   a first node coupled to the interconnect, wherein the first node includes:
      a memory configured to store data;
      a memory region table;
      a memory window table, said memory window table being in communication with the memory region table; and
      circuitry configured to control access to the memory;
   a second node coupled to the first node via the interconnect, wherein the second node is configured to convey a request for access to the memory in the first node, the request including a first virtual address and a remote access key;

wherein in response to receiving the request, the first node is configured to:

determine whether the request corresponds to a memory region or a memory window;

if the request corresponds to a memory region:

combine the first virtual address and the remote access key to form an index into a first entry of the memory region table; and if the request corresponds to a memory window:

(i) use a first portion of the remote access key to index into a first entry of the memory window table;

(ii) compare a second portion of the remote access key to a window table access key stored within the first entry of the memory window table; and (iii) allow processing to continue if the second portion of the remote access key matches the window table access key.

2. The system as recited in claim 1, wherein the first node is configured to determine whether the request corresponds to a memory region or a memory window by examining a most significant bit of the remote access key.

3. The system as recited in claim 2, wherein the first entry of the memory window table further includes a new remote access key, and wherein the system is further configured to combine the new remote access key with the first virtual address to form an index into a second entry into the memory region table, in response to determining the second portion of the remote access key matches the window table access key.

4. The system as recited in claim 3, wherein the request includes a first length, and wherein the first entry of the memory window comprises a second virtual address and second length, wherein the first node is configured to combine the new remote access key with the first virtual address in further response to determining the first virtual address and first length are contained within the address space defined by the second virtual address and the second length.

5. The system are recited in claim 2, wherein the first entry of the memory region table includes a first protection domain value, and wherein the first node is further configured to:

compare the first protection domain value with a second protection domain value of a send work queue which initiated the request;

allow access if the first protection domain value matches the second protection domain value; and deny access if the first protection domain value does not match the second protection domain value.

6. The system as recited in claim 5, wherein in response to allowing access, the first node is further configured to utilize a physical address included within the first entry of the memory region table to access the memory.

7. The system as recited in claim 6, wherein the second entry of the memory region table includes a second protection domain value, and wherein the first node is further configured to:

compare the second protection domain value with a third protection domain value of a send work queue which initiated the request;

allow access if the second protection domain value matches the third protection domain value; and deny access if the second protection domain value does not match the third protection domain value;

wherein in response to allowing access, the first node is further configured to utilize a physical address included within the second entry of the memory region table to access the memory.

8. The system as recited in claim 7, wherein the memory region table and the memory window table reside on one or more modules external to and in communication with an operating system.

9. The system as recited in claim 7, wherein an entry of the memory window table comprises:

a memory region record; and a memory window record.

10. A method for controlling access to a memory in a computing node, said method comprising:

receiving a request for access to the memory, the request including a first virtual address and a remote access key;

determining whether the request corresponds to a memory region or a memory window by examining a bit included within the request;

in response to determining the request corresponds to a memory region, combining the virtual address and the remote access key to form an index into a first entry of a memory region table, in response to determining the request corresponds to a memory region; and in response to determining the request corresponds to a memory window, (i) utilizing a first portion of the remote access key to index into a first entry of a memory window table, (ii) comparing a second portion of said remote access key to a window table access key stored within the first entry of the memory window table, and (iii) allowing processing to continue if the second portion of the remote access key matches the window table access key.

11. The method as recited in claim 10, wherein said determining comprises examining a most significant bit of the remote access key.

12. The method as recited in claim 11, wherein the first entry of the memory window table further includes a new remote access key, and wherein the method further comprises combining the new remote access key with the first virtual address to form an index into a second entry into the memory region table, in response to determining the second portion of the remote access key matches the window table access key.

13. The method as recited in claim 12, wherein the request includes a first length, and wherein the first entry of the memory window comprises a second virtual address and second length, wherein the method further comprises combining the new remote access key with the first virtual address in further response to determining the first virtual address and first length are contained within the address space defined by the second virtual address and the second length.

14. The method are recited in claim 11, wherein the first entry of the memory region table includes a first protection domain value, and wherein the method further comprises:

comparing the first protection domain value with a second protection domain value of a send work queue which initiated the request;

allowing access if the first protection domain value matches the second protection domain value; and denying access if the first protection domain value does not match the second protection domain value.

15. The method as recited in claim 14, wherein in response to allowing access, the method further comprises utilizing a physical address included within the first entry of the memory region table to access the memory.

16. The method as recited in claim 14, wherein the second entry of the memory region table includes a second protection domain value, and wherein the method further comprises:

comparing the second protection domain value with a third protection domain value of a send work queue which initiated the request;

allowing access if the second protection domain value matches the third protection domain value; and denying access if the second protection domain value does not match the third protection domain value;

wherein in response to allowing access, the method further comprises utilizing a physical address included within the second entry of the memory region table to access the memory.

17. A node for use in a system area network, the node comprising:

an adapter configured to receive a memory access request via a network interconnect, said request including a virtual memory address and a remote access key;

a memory configured to store data; and circuitry configured to control accesses to said memory, wherein in response to receiving a memory access request, said circuitry is configured to:

determine whether the request corresponds to a memory region or a memory window, responsive to examining a bit included within the request;

if the request corresponds to a memory region:
combine the first virtual address and the remote access key to form an index into a first entry of a memory region table; and if the request corresponds to a memory window:
(i) use a first portion of the remote access key to index into a first entry of a memory window table;
(ii) compare a second portion of the remote access key to a window table access key stored within the first entry of the memory window table; and (iii) allow processing to continue if the second portion of the remote access key matches the window table access key.

18. The node as recited in claim 17, wherein the circuitry is configured to determine whether the request corresponds to a memory region or a memory window by examining a most significant bit of the remote access key.

19. The node as recited in claim 18, wherein the first entry of the memory window table further includes a new remote access key, and wherein the circuitry is further configured to combine the new remote access key with the first virtual address to form an index into a second entry into the memory region table, in response to determining the second portion of the remote access key matches the window table access key.

20. The node as recited in claim 19, wherein the request includes a first length, and wherein the first entry of the memory window comprises a second virtual address and second length, wherein the circuitry is configured to combine the new remote access key with the first virtual address in further response to determining the first virtual address and first length are contained within the address space defined by the second virtual address and the second length.

21. The node are recited in claim 19, wherein the first entry of the memory region table includes a first protection domain value, and wherein the circuitry is further configured to:

compare the first protection domain value with a second protection domain value of a send work queue which initiated the request;

allow access if the first protection domain value matches the second protection domain value; and deny access if the first protection domain value does not match the second protection domain value.

22. The node as recited in claim 21, wherein in response to allowing access, the circuitry is further configured to utilize a physical address included within the first entry of the memory region table to access the memory.

* * * * *